Oct. 14, 1924.
E. NAIRNE
1,511,357
AUTOMOBILE GOGGLES
Original Filed June 13, 1922
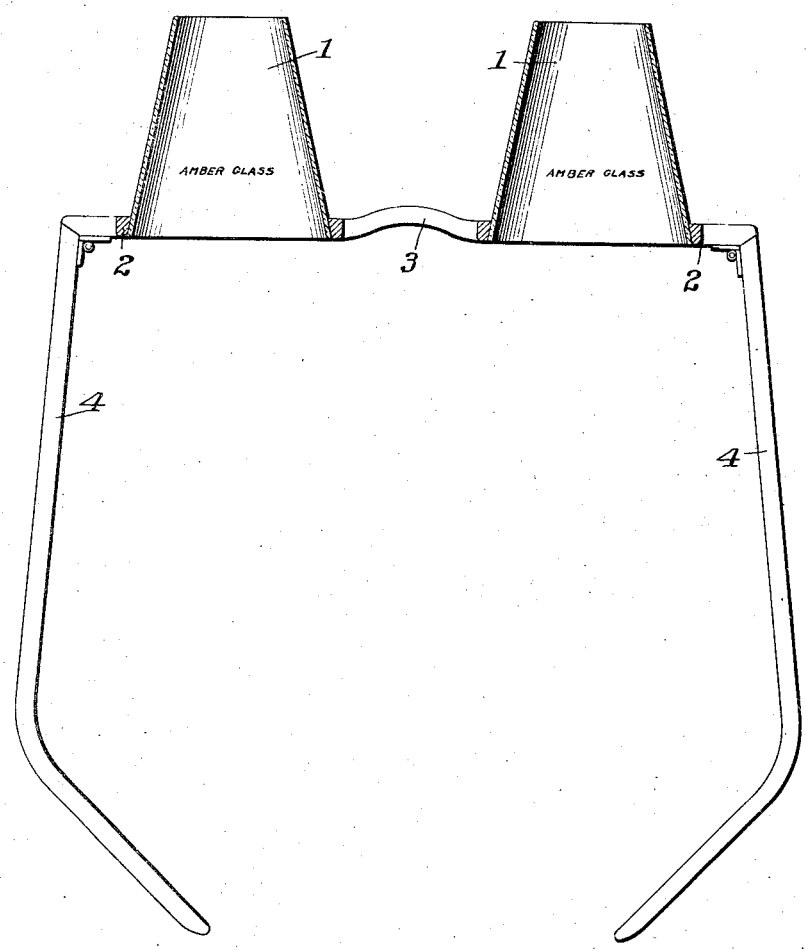
Inventor
Eldridge Nairne,
By [signature]
Attorney Patented Oct. 14, 1924.

1,511,357

UNITED STATES PATENT OFFICE.

ELDRIDGE NAIRNE, OF ROXBURY, MASSACHUSETTS, ASSIGNOR OF ONE-THIRD TO DAVID FINKELSTEIN, OF BOSTON, MASSACHUSETTS, AND ONE-THIRD TO JACOB GOOSE, OF CHELSEA, MASSACHUSETTS.

AUTOMOBILE GOGGLES.

Application filed June 13, 1922, Serial No. 567,895. Renewed June 18, 1924.

*To all whom it may concern:*

Be it known that I, ELDRIDGE NAIRNE, a citizen of the United States, residing at Roxbury, in the county of Suffolk and State of Massachusetts, have invented new and useful Improvements in Automobile Goggles, of which the following is a specification.

The invention relates to automobile goggles.

The object of the invention is to improve the construction of automobile goggles and to provide a simple, practical and efficient device adapted to afford an unobstructed view ahead and a glare eliminated view at each side, so that a clear vision of portions of a road, both ahead and to the sides will be afforded to prevent the blinding effect of headlights of approaching automobiles, as well as lights along the sides of a road.

With these and other objects in view the invention consists in the construction and novel combination and arrangement of parts hereinafter fully described, illustrated in the accompanying drawing, and pointed out in the claim hereto appended, it being understood that various changes in the form, proportion and minor details of construction, within the scope of the claim, may be resorted to without departing from the spirit or sacrificing any of the advantages of the invention.

The figure of the drawing is a longitudinal sectional view of a pair of goggles constructed in accordance with this invention.

In the accompanying drawing, in which is illustrated the preferred embodiment of the invention, the automobile goggles comprises in its construction a pair of tapered tubular approximately trunco-conical tubes or tubular members 1, tapered outwardly or forwardly and constructed of amber glass or other suitable material and mounted in a frame for attaching the tubes or tubular members 1 to the head of the wearer. The frame is composed of circular rims 2 and a connecting nose piece or bridge 3 and side frame members 4, which are adapted to fit over the ears of the wearer. The circular rims 2 fit around the inner or rear ends of the tubular members and are suitably secured to the same so that the tubular members, which are connected at their inner or rear ends by the frame extend forwardly from the same and are open at their inner and outer ends and throughout their entire length, so as to present a clear and unobstructed view through the said members.

These tubular members which, while preferably constructed of amber glass, may be of any other glare eliminating tint or color, are semi-transparent or translucent for enabling the wearer, when an automobile or other motor vehicle approaches with blinding headlights, to obtain a clear unobstructed view of the road ahead by slightly turning his head to carry the outer ends of the tubes away from the headlights of the approaching machine and at the same time the semi-transparent or translucent tubes will afford a clear view of the lights of the approaching machine and also of the lights along the road with the glare eliminated therefrom. As the tubes are open at each end and are unobstructed throughout their length the view ahead is as clear as if the goggles were not worn and there were no blinding lights along the road. This will render driving at night comparatively safe and will eliminate the accidents which frequently result from operators of machines becoming confused by the blinding glare of the headlights of approaching machines and also of lights along the road at either side of the same.

What is claimed is:

Automobile goggles comprising a pair of forwardly tapered, substantially trunco-conical tubular members composed throughout their length of semi-transparent or translucent material to eliminate glare through the sides of the tubular members and open throughout their length and at each end to permit an unobstructed view ahead through the tubular members and a clear glare eliminated view through the sides of the members, and a frame provided with openings in which the inner ends of the tubular members are directly secured and supported, and means connected to the frame for attaching the same to the head of the wearer, the frame having a curved part intermediate its ends between the tubular members forming a bridge for the nose of the wearer.

In testimony whereof I have hereunto set my hand.

ELDRIDGE NAIRNE.